Figure 1:
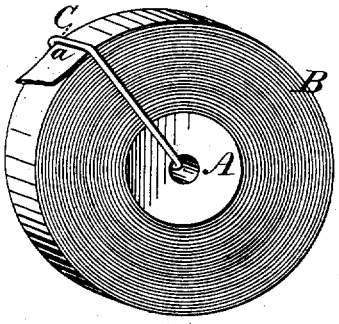

D. & D. L. GOFF,

Assignors to D. GOFF & SONS.

Clasp for Braid Packages.

No. 8,725. Reissued May 27, 1879.

Witnesses:
Philip F. Larner
Howell Bartle

Inventors:
Darius Goff
Darius L. Goff
By
Wm. C. Maxwell
Attorney

N. PETERS, PHOTO-LITHOGRAPHER, WASHINGTON, D. C.

UNITED STATES PATENT OFFICE.

DARIUS GOFF AND DARIUS L. GOFF, OF PAWTUCKET, RHODE ISLAND, ASSIGNORS TO D. GOFF & SONS, OF SAME PLACE.

IMPROVEMENT IN CLASPS FOR BRAID-PACKAGES.

Specification forming part of Letters Patent No. 198,375, dated December 18, 1877; Reissue No. 8,725, dated May 27, 1879; application filed January 29, 1879.

*To all whom it may concern:*

Be it known that we, DARIUS GOFF and DARIUS L. GOFF, both of Pawtucket, in the county of Providence and State of Rhode Island, have invented certain new and useful Improvements in Clasps for Braid-Packages; and we do hereby declare that the following specification, taken in connection with the drawings furnished and forming a part of the same, is a clear, true, and complete description thereof.

Braid-packages, as heretofore formed, have generally been termed "sticks," and they are made up of a continuous length of the flat worsted, cotton, or silk braid, folded or doubled in uniform lengths upon itself, and secured by having a considerable portion thereof wrapped around the stick or bunch. This necessarily involves a comparatively bulky package, and one which in the hands of the retailer is open to serious objections, in that when a customer desires to match a certain color with braid the latter is pulled, more or less, from several of the sticks before the accurate match is obtained, and, as a consequence, the retailer's stock is soon a mass of roughly-broken packages, which are bulky and inconvenient to handle, and unattractive to the consumer.

In the hands of the domestic consumer, small quantities of braid less than a stick are sometimes desired, and the remainder is usually hastily rolled into a wad, or left loose at the ends, resulting in absolute waste thereof, or in its assuming a stretched or rumpled condition, which renders it difficult, if not impossible, to use.

The object of our invention is to render the packages less bulky than heretofore, to enable the customer when sampling to run off the desired length for matching without breaking the package, and the retailer to readily replace the end as originally arranged, and to enable the consumer to maintain the last braid in the package in as good condition as that first taken therefrom.

To these ends our invention consists, mainly, in the combination, with any desired length of braid, coiled or wound eccentrically, of a metallic clasp, which engages with the central portion of the coil, and extends therefrom in contact with both sides of the coil of braid and its periphery. Said metallic clasp affords a lateral support to the coil, and serves as a peripherical guide for evenly rewinding the loose end of the braid after it has been run off for matching or other purposes, and it also affords side surfaces, with which the thumb and finger may engage for holding the package while the free end of braid is being drawn off, the inner ends of the clasp then serving as pivots, on which the coil revolves; and, further, our invention consists in the combination of a central wooden or other suitable core for supporting the braid, and a metallic clasp, which engages with the central core and the sides and periphery of the coil of braid, and affords a lateral support for the coil.

The capacity of our clasp to serve as a means for holding the package of braid in unwinding and rewinding is due to its being capable of resisting such pressure of the thumb and finger as is requisite for holding the package without interfering with the free rotation of the coil; and our invention further consists in the combination, with a central core, of a clasp which controls the free end of a length of braid coiled around said core, operates as a guide in rewinding, affords side supports for the braid, and which also, by reason of its rigidity, serves as a holder, whereby the braid-package may be securely held, as in unwinding and rewinding, without interfering with the rotation of the coil.

To more particularly describe our invention, we will refer to the accompanying drawings, in which—

Figure 2:
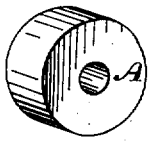
Figure 3:
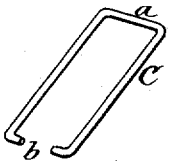
Figure 4:
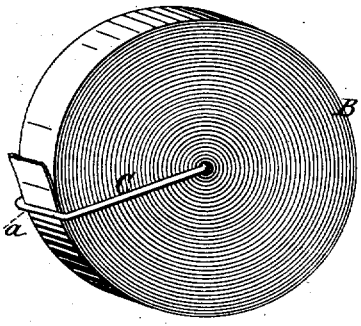

Figure 1 represents, in perspective, a braid-package complete, embodying all the features of our invention. Fig. 2 represents, in perspective, a central core. Fig. 3 represents, in perspective, our clasp. Fig. 4 represents, in perspective, a braid-package embodying only the main feature of our invention.

A denotes the central core, which is preferably composed of wood, with a plain periphery and a central opening. As in the case of spools, the heads of the core are or may be provided with a printed label, or embossed or printed direct with a suitable inscription.

B denotes the braid, in any desired length, eccentrically wound or coiled truly and solidly on the core. The length of the core should correspond with the width of the braid.

C denotes the clasp. It is preferably composed of hard wire, in the form of a loop, with straight parallel sides and a rectangular straight outer end, as at *a*, for engaging with the periphery of the package. At its inner end each side is bent inward to form fingers, as at *b*. The braid having been wound, the clasp is spread apart and placed in position, as shown in Fig. 1, with its fingers piercing the label, if one be used, and entering the axial opening in the core.

It will be seen that by throwing the clasp backward a sufficient length of the braid can be released for sampling and matching, after which, by moving the clasp forward, the end may be readily secured. The packages are much more compact, and the braid, under all circumstances preceding its actual use, is maintained in a much better condition than when in the stick packages, as heretofore.

In Fig. 4 the package is shown to have no central core. Although a core is preferable in most cases, valuable results will be attained if the braid be solidly wound upon a small square arbor, which, when the braid is removed therefrom, will afford a central opening for the reception of the fingers of the clasp.

We are aware that prior to our invention woven tapes and stay-bindings and such other narrow fabrics have been put up in coils and secured by a clip composed of an elastic band, as shown and described in the United States Letters Patent of M. B. Westhead, dated October 3, 1865, and that a sliding clip has heretofore been used for embracing several of the outer layers of such fabrics, as described in Letters Patent of said Westhead, dated July 28, 1868, reissued October 26, 1869.

We are also aware that it has heretofore been proposed to employ, in connection with flanged spools, various devices for controlling the loose end of a narrow fabric wound on such spools, several forms of which are shown and described in the English provisional specification of Masters, No. 496 of A. D. 1863.

Our clasp differs from any heretofore known to us, in that it serves as a rigid side guide near the periphery of the coil for readily and evenly rewinding the loose end of the braid, is sufficiently rigid to afford side surfaces, by which the package may be held between thumb and finger while rewinding a loose end, and also sufficiently rigid to maintain the coil of braid against lateral displacement under ordinary circumstances, which is a matter of special consequence in braid-packages, in view of the fact that braid cannot practically be wound as solidly as tapes, stay-bindings, and such other woven fabrics, on account of its elasticity, and because, if it be wound under heavy tension, its normal width will be materially reduced. The radial elasticity of coiled braid is such that, even in small packages, if the metallic clasp be properly proportioned to the coil, the outer end of the clasp will continue in contact with the periphery after several layers have been unwound, and a single unwound layer is usually sufficient for sampling or matching. The clasp being laterally rigid, it will also maintain a partial coil of braid in its coiled condition.

Having thus described our invention, we claim as new and desire to secure by Letters Patent—

1. The combination, with a coiled length of braid, of a metallic clasp which is pivotally secured at or near the center of the coil, and extends in contact with the braid on each side and across the periphery of the coil, substantially as described, and for the purposes specified.

2. The combination, with a central core, of a metallic clasp adapted to engage with the sides and periphery of a coil of narrow fabric, and pivoted to the central core, substantially as described.

3. The combination, with a central core, of a clasp which controls the free end of braid coiled around said core, operates as a guide in rewinding, affords side supports, and which also, by reason of its rigidity, serves as a holder, whereby the braid-package may be securely held without interfering with the rotation of the coil, substantially as described.

DARIUS GOFF.
DARIUS L. GOFF.

Witnesses:
W. W. BLODGETT,
EDW. W. BLODGETT.